United States Patent
Sharpe et al.

(10) Patent No.: US 8,701,022 B2
(45) Date of Patent: Apr. 15, 2014

(54) METHOD AND SYSTEM FOR ARCHIVING AND RETRIEVING ITEMS BASED ON EPISODIC MEMORY OF GROUPS OF PEOPLE

(75) Inventors: Elizabeth Sharpe, Edinburgh (GB); John Leslie Fraser, Edinburgh (GB)

(73) Assignee: 6S Limited, Edinburgh (GB)

( * ) Notice: Subject to any disclaimer, the term of this patent is extended or adjusted under 35 U.S.C. 154(b) by 1116 days.

(21) Appl. No.: 12/264,381

(22) Filed: Nov. 4, 2008

(65) Prior Publication Data

US 2009/0183091 A1 Jul. 16, 2009

Related U.S. Application Data

(63) Continuation-in-part of application No. 09/670,635, filed on Sep. 26, 2000, now Pat. No. 7,461,099.

(51) Int. Cl.
*G06F 3/048* (2013.01)
(52) U.S. Cl.
USPC ............................................ 715/761; 715/764
(58) Field of Classification Search
USPC .................................................. 715/761, 764
See application file for complete search history.

(56) References Cited

U.S. PATENT DOCUMENTS

| | | | |
|---|---|---|---|
| 5,485,611 A | | 1/1996 | Astle |
| 5,493,677 A | * | 2/1996 | Balogh et al. ................. 382/305 |
| 5,526,520 A | | 6/1996 | Krause |
| 5,630,121 A | | 5/1997 | Braden-Harder et al. |
| 5,706,457 A | * | 1/1998 | Dwyer et al. ................. 715/835 |
| 5,715,445 A | | 2/1998 | Wolfe |
| 5,828,904 A | | 10/1998 | Batson et al. |
| 5,835,667 A | * | 11/1998 | Wactlar et al. ................. 386/241 |
| 5,842,009 A | | 11/1998 | Borovoy et al. |
| 5,943,670 A | | 8/1999 | Prager |
| 5,991,758 A | | 11/1999 | Ellard |

(Continued)

FOREIGN PATENT DOCUMENTS

| | | |
|---|---|---|
| EP | 0 637 807 A2 | 2/1995 |
| EP | 0 678 816 A2 | 10/1995 |

(Continued)

OTHER PUBLICATIONS

Alexander C. Loui and Mark D. Wood, A Software System for Automatic Albuming of Consumer Pictures, pp. 159-162.

(Continued)

*Primary Examiner* — Omar Abdul-Ali
*Assistant Examiner* — Anil Bhargava
(74) *Attorney, Agent, or Firm* — Kenyon & Kenyon, LLP

(57) ABSTRACT

A method and system are provided for archiving and retrieving digital media items based on episodic memory for predefined associated groups of one or more people. The method and system may comprise identifying one or more groups to which an archiving user belongs; receiving a user input identifying select groups to which a digital media item to be archived; receiving archiving input data identifying the digital media item to be archived for the group; generating index information using the received user archiving input; storing the index information in association with the identified digital media item; repeating the reception of archiving input data, the generation of the index information and the storing of the index information for the digital media item; receiving retrieval input data representing a selection of candidate values; and using the selections and the identified group to retrieve and output digital media items that match the selection.

20 Claims, 11 Drawing Sheets

(56) References Cited

U.S. PATENT DOCUMENTS

| | | | |
|---|---|---|---|
| 6,119,133 A | 9/2000 | Nusbickel et al. | |
| 6,438,539 B1 | 8/2002 | Korolev et al. | |
| 7,584,227 B2* | 9/2009 | Gokhale et al. | 1/1 |
| 2003/0043282 A1* | 3/2003 | Malloy Desormeaux | 348/231.3 |
| 2004/0177319 A1 | 9/2004 | Horn | |
| 2006/0161635 A1 | 7/2006 | Lamkin et al. | |
| 2006/0174206 A1* | 8/2006 | Jung et al. | 715/751 |
| 2006/0239648 A1* | 10/2006 | Varghese | 386/95 |
| 2006/0242121 A1* | 10/2006 | DeVorchik et al. | 707/3 |
| 2007/0061378 A1* | 3/2007 | Lee et al. | 707/200 |
| 2007/0157108 A1* | 7/2007 | Bishop | 715/771 |
| 2007/0162359 A1* | 7/2007 | Gokhale et al. | 705/28 |
| 2008/0066080 A1* | 3/2008 | Campbell | 719/314 |
| 2008/0091723 A1* | 4/2008 | Zuckerberg et al. | 707/104.1 |
| 2008/0263053 A1* | 10/2008 | Hull | 707/10 |
| 2009/0210793 A1* | 8/2009 | Yee et al. | 715/723 |
| 2009/0216806 A1* | 8/2009 | Feuerstein et al. | 707/104.1 |
| 2009/0228492 A1* | 9/2009 | Valdez et al. | 707/10 |
| 2009/0319472 A1* | 12/2009 | Jain et al. | 707/2 |
| 2010/0030841 A1* | 2/2010 | Busoms Pujols et al. | 709/202 |
| 2010/0036967 A1* | 2/2010 | Caine et al. | 709/236 |
| 2010/0287053 A1* | 11/2010 | Ganong et al. | 705/14.66 |

FOREIGN PATENT DOCUMENTS

| | | |
|---|---|---|
| EP | 0 717 346 A2 | 6/1996 |
| EP | 1 004 967 A1 | 5/2000 |
| EP | 1 074 923 A2 | 2/2001 |
| WO | WO-99/19816 | 4/1999 |
| WO | WO-00/30000 | 5/2000 |
| WO | WO-00/51342 | 8/2000 |
| WO | WO-01/80080 A2 | 10/2001 |
| WO | WO-01/80081 A2 | 10/2001 |

OTHER PUBLICATIONS

K. Priyantha Hewagamage and Masahito Hirakawa, Augmented Album: Situation-dependant System for a Personal Digital Video/Image Collection, pp. 323-326.

Shneiderman et al. (Direct Annotation: A Drag-and-Drop Strategy for Labeling Photos, Aug. 2000.

Naaman, Mor, et al., "Context Data in Geo-Referenced Digital Photo Collections", Proceedings of the ACM International Conference on Multimedia, NY, NY, Oct. 10, 2004, pp. 196-203.

Davis, Marc, et al., "From Context to Content: Leveraging Context to Infer Media Metadata", Internet Citation, Oct. 16, 2004, pp. 1-8.

* cited by examiner

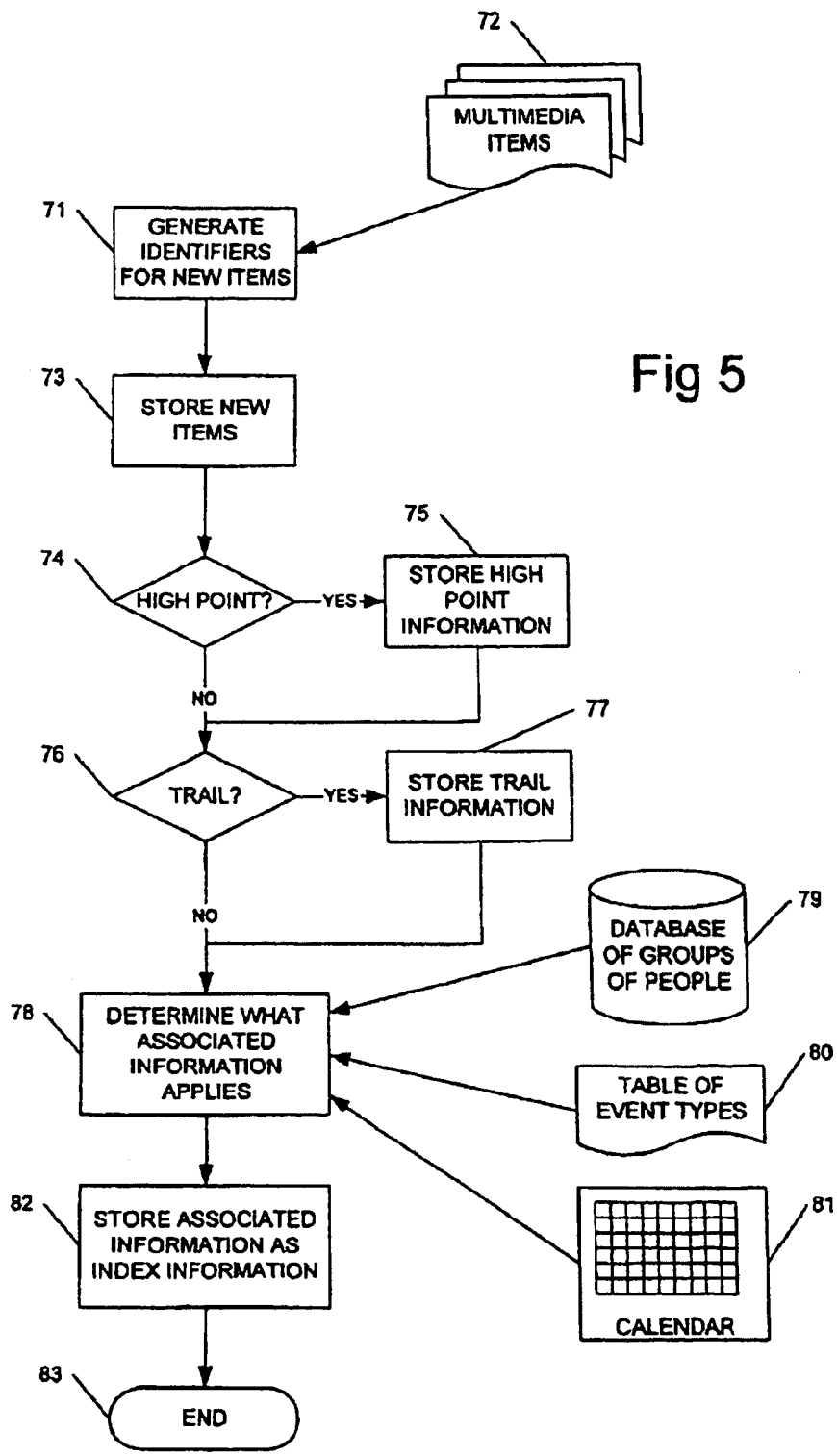

| GROUP IDENTIFIER | PEOPLE |
|---|---|
|  |  |
|  |  |

Fig 6a

| GROUP IDENTIFIER | ITEM IDENTIFIER |
|---|---|
|  |  |
|  |  |

Fig 6b

| ITEM IDENTIFIER | HIGH POINT FLAG |
|---|---|
|  |  |
|  |  |

Fig 6c

| TRAIL IDENTIFIER | FIRST ITEM IDENTIFIER | SECOND ITEM IDENTIFIER | THIRD ITEM IDENTIFIER |
|---|---|---|---|
|  |  |  |  |
|  |  |  |  |
|  |  |  |  |

Fig 6d

| ITEM IDENTIFIER | MEDIUM TYPE | PEOPLE | TIME | EVENT TYPE |
|---|---|---|---|---|
|  |  |  |  |  |
|  |  |  |  |  |
|  |  |  |  |  |

| item | | | | focus | | | | |
|---|---|---|---|---|---|---|---|---|
| medium type | associated information | | | people | time | event type | shift? | notes |
| | people | time | event type | | | | | |
| image | Sonia, Cheryl | 4 May 98 | party | any | 1998 | Party | ✔ | initial focus |
| sound | Tana | 4 May 98 | party | | | | | |
| sound | Cheryl, Caitlin | 4 May 98 | party | | | | | |
| video | Sonia | 4 May 98 | party | | | | | |
| text | Sonia | 4 May 97 | party | Sonia | any | party | ✔ | focus changes onto a person; same event type |
| sound | Sonia, Cheryl | 3 Jan 97 | party | | | | | |
| image | Sonia, Cheryl, Tana | 14 Mar – 18 Mar 97 | school trip | Sonia | spring 97 | Any | ✔ | focus changes onto a period; same person |
| image | Sonia | 3 Apr 97 – 10 Apr 97 | vacation | | | | | |
| text | Sonia | 15 Apr 97 | date | | | | | |
| sound | Sonia | 13 Oct 99 | date | Sonia | any | date | ✔ | focus changes onto an event type; same person |
| image | Sonia | 13 Oct 99 | date | | | | | these 3 items are a high point (no special order) |
| text | Sonia | 13 Oct 99 | date | | | | | |
| image | Caitlin, Sonia | 12 Jan 96 | date | | | | | |
| image | Sonia, Cheryl, Caitlin, Tana | 2 Jan 96 | show | Caitlin | Jan 96 | any | ✔ | focus changes onto a person and a time period |
| text | Sonia, Cheryl, Caitlin, Tana | 2 Jan 96 | show | | | | | these 4 items in this sequence are a trail |
| image | Sonia, Cheryl, Caitlin, Tana | 29 Jan 96 | get-together | | | | | |
| audio | Sonia, Cheryl, Caitlin, Tana | 29 Jan 96 | get-together | | | | | |
| image | Sonia, Cheryl, Tana | 30 Jan 96 | school outing | Sonia, Cheryl | Jan 96 | get-together | ✔ | this focus is narrow (people, time and event type all specified) |
| ... | ... | ... | ... | ... | ... | ... | ... | ... |
| image | Cheryl | 4 Oct 997 | dance | any | 1997 | any | ✔ | focus can be broad (people or time or event type) |

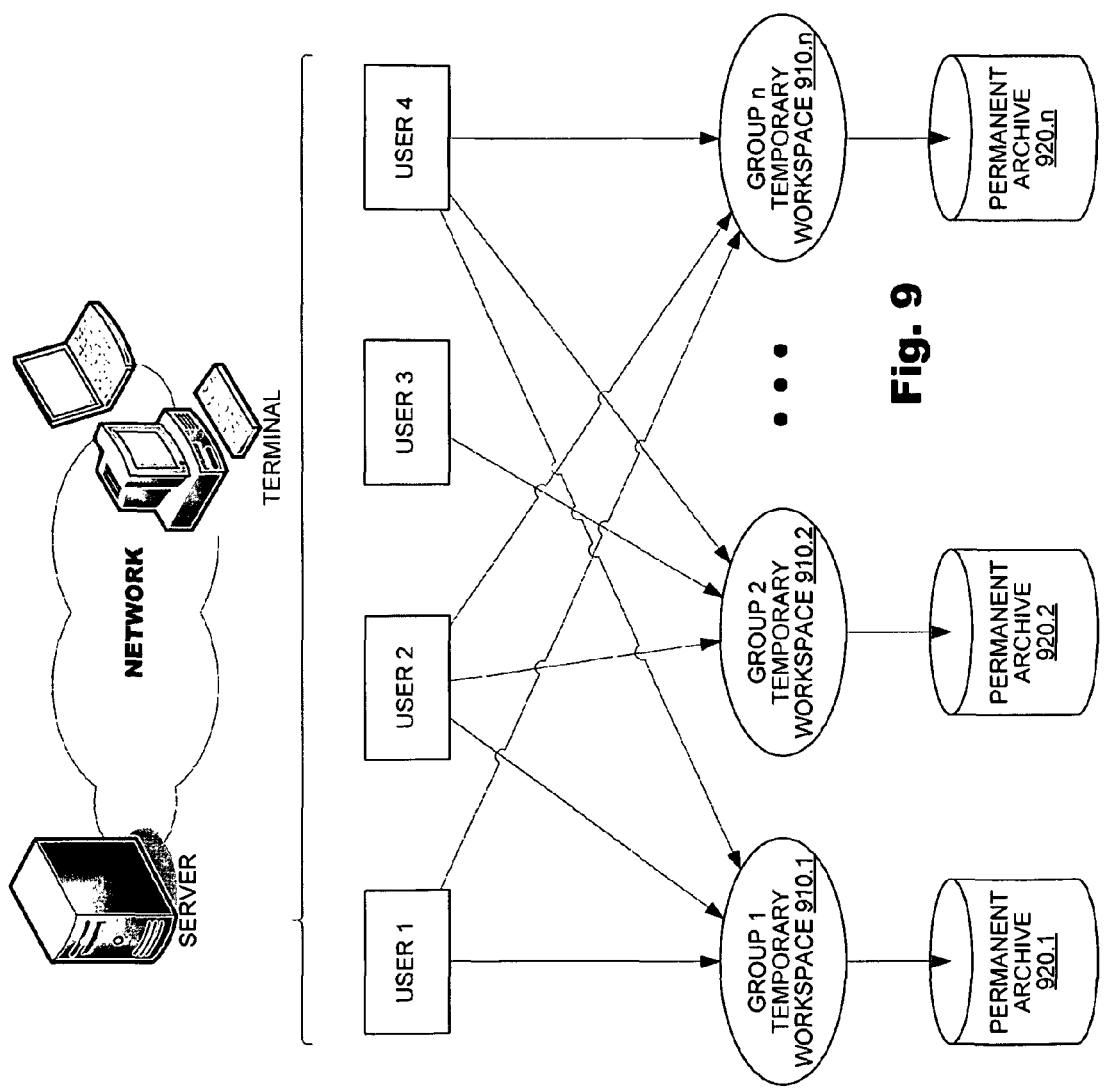

METHOD AND SYSTEM FOR ARCHIVING AND RETRIEVING ITEMS BASED ON EPISODIC MEMORY OF GROUPS OF PEOPLE

RELATED APPLICATIONS

This application is a continuation in part of U.S. application Ser. No. 09/670,635 filed Sep. 26, 2000 (pending), the contents of which are incorporated herein by reference.

FIELD OF THE INVENTION

The present invention generally relates to archiving and retrieval of digital media items. In particular, it relates to archiving and retrieval process based on episodic memory of predefined groups of people.

BACKGROUND

Storage and archiving techniques for digital media and corresponding retrieval techniques are well known. However, the work in this field is concentrated on facilitating the retrieval of a particular digital media item i.e., one which matches the user's requirements exactly. The prior art archiving and retrieval systems are based on a semantic memory approach. Such an approach is suited to the location of items relevant to a specific requirement.

The present invention provides a different approach to the archiving and retrieval of digital media items of any type. The invention is based on the fact that groups of people now readily establish archives of digital media items that reflect their activities, relationships and interests. The archiving and retrieval system of the present invention is designed for use by strong interpersonal groups, such as those formed by teenage girls, families, work mates, or sports teams or clubs. The invention can also be used by individuals to archive and retrieve digital media items relating to a group of people. The invention is based on the realization that people in creating these digital archives, are establishing group 'memory' and indulging in group nostalgia. Tools bases on episodic memory rather than semantic memory will be more effective and desirable for these purposes.

SUMMARY

In accordance with a first aspect of the present invention, there is provided a method and apparatus for archiving and retrieving digital media items in which the archiving and retrieval process is based on the common episodic memory of a social group. To archive digital media items, a user identifies a group to which the user belongs. If it is used by an individual, the individual may set up a group for himself/herself. In this case the archiving and retrieval is based on the episodic memory of the individual in relation to activities of the group. Once the user has identified the group to which the user belongs, one or more digital media items to be archived for the group can then be identified. The digital media item to be archived may either already have been stored in an archive or may get stored in the archive as part of the archiving process. In order to archive the digital media item, a user can select to index the digital media item using finite sets of enumerate parameters. More specifically the sets of parameters may comprise group event types to which the media item relates, persons associated with the digital media item, and a time period associated with the digital media item. The user wishing to archive the digital media item can thus select zero or more group event types, zero or more persons in the group and a time which can be defaulted to a default "no time" or to the current date. Using these three parameters index information for the digital media items may be generated and stored in association with the digital media items. For retrieval, a user can manually select the three parameters or they can be automatically generated. Thus a user can select zero or more group event types, zero or more persons and a time period. The manually or automatically selected parameters may be used to retrieve digital media items. The automatic generation of parameters enables random reminiscence through archived digital media items by group members.

The use of time, people and event types as the three fundamental indices for archiving and retrieval may provide a simple user friendly method of archiving material since it is based on the way people remember things. The application of these indices to a group with shared experience may limit the number of people and event types needed for indexing or retrieving the digital data items. This may facilitate a simple user interface such as a pull down menu on a Graphical User Interface (GUI) to allow selection of a person and event type from all possible people and event types, and to allow selection of a particular time. The time used for indexing can comprise not just a specific time such as a date, but a time period such as a range of dates e.g., 17th to 24th Jul. 2000 or August 2000.

Because the collection and indexing of the digital media items may be based on episodic memory of the group, i.e., the group members have chosen the digital media items and indexed them according to their relevance to the group, the retrieval and browsing through data digital items are attuned to memories of the group members. The goal of retrieval is not to retrieve a specific digital media item but instead to retrieve any digital media items relating to a memorable episode. Thus the indexing system does not uniquely identify digital media items, but replaces them within a highly personal framework. For example, even if a specific photograph were required, it would be remembered through the event and hence retrieved by searching on the event or the person. Thus the archive may contain many commonly indexed images taken at the same time period involving the same people at the same event.

When a group is set up, a group identifier may be assigned so that all digital media items archived for that group can be associated to the group in the archive. A user setting up a group may select a number of group members and a number of group event types which are relevant to the episodic memory of the group. Members can be added to groups over time and event types can be supplemented thus expanding the index of the archived digital media items. This allows flexibility since members of social groups do not always remains fixed. The event types for different social groups can be determined prior to use depending on the typical shared experiences of the group, e.g., family, friends, sports team or club, or sales organization.

The digital media items to be archived may be already archived digital media items to which the index information may be associated. Alternatively, the digital media items may be retrieved from another stored location, for example, on a CD ROM or on a web site, or the digital media items may be generated, e.g., by typing text to provide a text item, recording sound to provide an audio item, using a drawing package to create an image item, taking or scanning pictures to generate image items or inputting digital video images to provide video items. In a preferred embodiment, a user may be provided with capability to obtain digital media items of any media type from any location.

An embodiment of the present invention additionally provides the ability to provide the user with a serendipitous nostalgic experience. A user may select an automatic retrieval and browsing of digital media items. As an initial query for retrieval, a time, period, one or more event types, and one or more people may be automatically randomly selected. This forms an initial "focus" for a search. The focus is analogous to that on a camera whereby a wide focus draws in many items while a narrow focus reveals a smaller number of items. Having performed an initial retrieval based on the initial focus, the focus can be shifted e.g. by simply changing one of the parameters to retrieve different digital media items and thus take the user on a nostalgic trip. Alternatively, the focus can be broadened or narrowed. Since the focus indicates the breadth of indexing, the indexing fields for time, people and event types can be broadened or narrowed to broaden or narrow the focus of the search. For example a wide focus might comprise a time range of the year 1999, a people range of everybody in the group, an event range of parties or gigs. A narrower focus may comprise a time range of August of 1999, either of two people in the group, and an event type comprising a school outing.

The present invention is not just applicable to the archiving and retrieval of digital media items for leisure purposes. The present invention can be used in a business context as well. For example, it may be used as a brain-storming aid by an individual or a group. The system may be useful in trying to retrieve digital media items related to a memorable episode such as a particular meeting which took place with particular people on a particular date. The meeting may have e-mails, letters, and presentations associated with it. The system will allow members of the group to archive and retrieve digital media items relating to such a meeting using parameters which mimic their memory process.

A second aspect of the present invention provides a method and apparatus for archiving a digital media item in which index information may be generated by allowing a user to identify a time, at least one person from a predetermined plurality of people, and an event type from a predetermined plurality of event types; and storing the index information in association with the digital media item.

The index information may be stored together with the digital media item for example as a "header". Alternatively, the digital media items may be stored separately with unique identifiers such as a file name or index. The index information then carries a reference to this unique identifier. The index information may be stored separately from the digital media items in a faster storage medium. This allows the digital mediabase to be searched quickly but does not use the expensive, fast access storage for space consuming digital media files.

In accordance with a third aspect, the present invention provides a method of retrieving a digital media item from a database, the method comprising identifying a digital media item within the database; automatically identifying another digital media item within the database; and retrieving that other digital media item. The other digital media item can be identified via a previously stored association with the first mentioned digital media item, or the other digital media item can be identified at random. The previously stored association can indicate that the digital media items have at least one common characteristic. The further digital media item can be retrieved automatically or can be identified to the user that there is another digital media item which can then be selected by the user.

The present invention can be implemented on a stand alone processing apparatus or over a network. The database of index information and digital media items may not be physically located with the processing apparatus which is used by a user. In one embodiment, the present invention is implemented over the Internet using the World Wide Web. A server provides the functionality to interface the digital media item database and the index information database to users. The users can access the server using a conventional web browser running on a computer or a Web TV. Alternatively, the user may use a mobile device that uses a suitable protocol such as the Wireless Application Protocol (WAP) for accessing the server. The digital media items can be input to the user's device, e.g., by typing or reading digital media files. The digital media items can then be uploaded to the server for archiving. Alternatively, the user may access digital media items over the Internet for archiving.

Conveniently the present invention can be implemented on any suitable processing apparatus by processor readable and executable code. The code can be provided to the processing apparatus on any suitable carrier medium such as a storage medium, e.g., floppy disk, CD ROM, programmable memory device, or tape device, or a signal, such as an electronic signal carried over a network such as the Internet. Thus the processor readable and executable code can be provided to a suitable processing apparatus on such a carrier medium in order to implement the method and system of the present invention.

BRIEF DESCRIPTION OF THE DRAWINGS

FIG. 5 is a flow diagram of the archiving process in accordance with an embodiment of the present invention;

FIGS. 6a, 6b, 6c, 6d and 6e illustrate the tables of the index information stored in the database in accordance with an embodiment of the present invention;

FIG. 8 is a table illustrating the serendipitous nostalgic process in accordance with an embodiment of the present invention; and FIG. 9 illustrates a block diagram of a system according to an embodiment of the present invention.

DETAILED DESCRIPTION

The present invention provides for archiving and retrieving digital media items based on episodic memory associated with social groups. In one exemplary embodiment, an archiving user may be a member of multiple groups. The present invention identifies a social group to which an archiving user belongs and stores digital media items to be archived for the social group. The present invention builds index information for the digital media items such that each instance of index information identifies an event type associated with a respective digital media item and select member(s) of the social group. In one exemplary embodiment, to perform a retrieving process, the present invention receives a user input identifying select social group(s) for which a search is to be conducted and identifies candidate identification values based upon the select social group(s). The present invention provides a query to identify the candidate identification values. The candidate identification values may include event types for the select social group(s), persons from the select social group(s). In response to the query, selection of the candidate identification values may be made and a database may be searched. Digital media items that satisfy the selection criteria may be retrieved.

Figure 1:
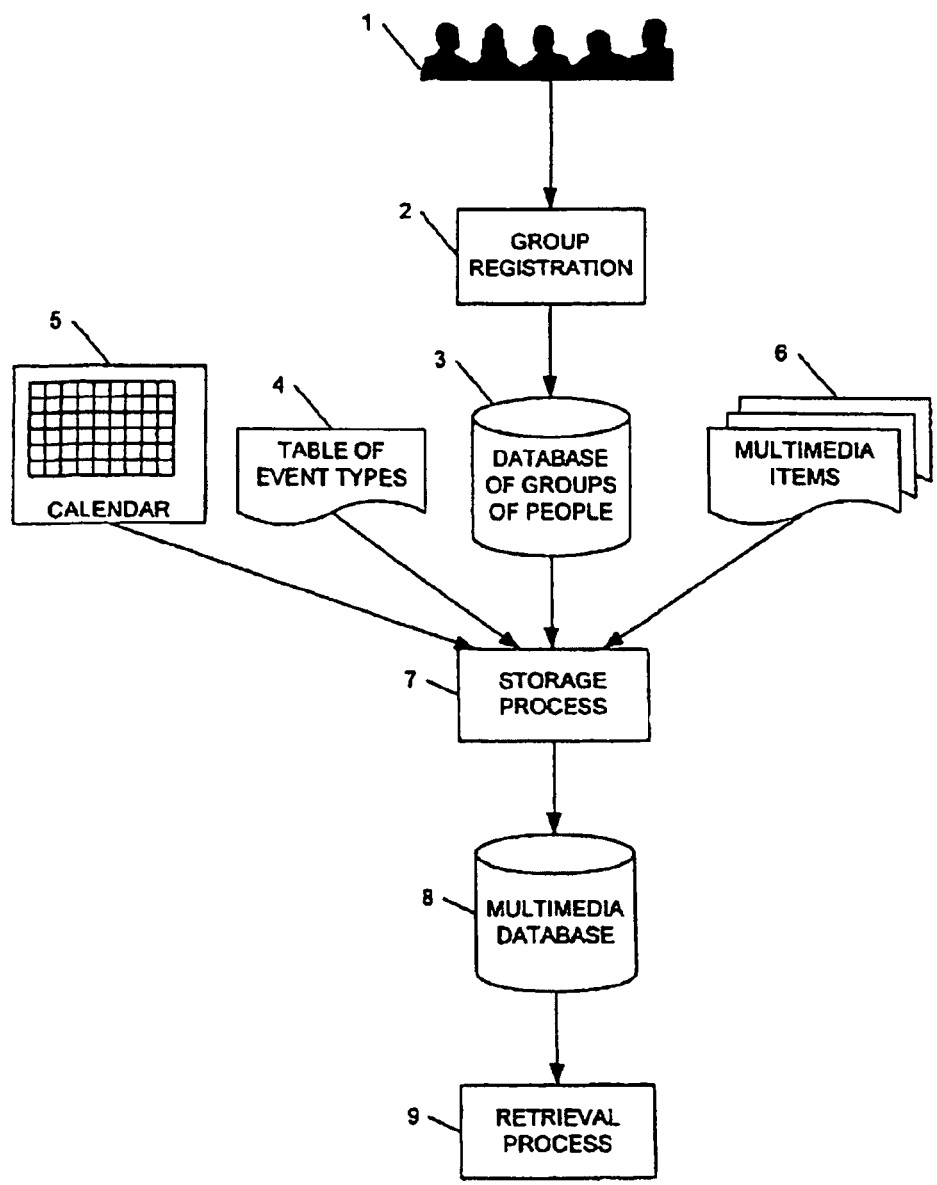
FIG. 1 is a block diagram giving an overview of the present invention.

FIG. 1 shows a block diagram of an overview of an embodiment of the present invention in which groups of users 1 are registered by a group registration process 2 in a database 3. It is assumed that the members of the private group work together (or an individual works independently but uses digital media items related to other users) to identify, collect, translate or create digital media items in different media e.g., favorite phrases, photographs, verses of poetry, recordings of their own voices, clips of home videos, or clips from their favorite musk. These items collectively represent the culture of the group or individual. The items may all be in the same medium, e.g. photographs or music recordings. The items can be archived and at a later time individuals in the group or the group as a whole can reminisce and review the contents of the archive.

The group registration process 2 is preferably only performed once although it is possible to update the groups over time. It is preferred to keep this activity to a minimum however to ensure a database meaningful to the group is constructed. An example of a necessary modification to the group is when a new baby joins a family. The storage process 7 is responsible for associating, with each item to be stored, an identifier and any other associated information for the index. The storage process 7, which will be described in more detail hereinafter, comprises identifying a group of people from the database 3, identifying one or more multimedia items to be archived 6 with index information, selection of an event type from a table of possible event types for the group of people 4 and selecting a date from the calendar 5. Also individuals within the group identified on the database 3 are selected using the database 3 for association with the selected item or items. Thus the storage process 7 indexes one or more multimedia items in accordance with the group, members of the group, one or more event types, and a date. Also, the storage process 7 can further index the multimedia items to give details of high points and trails as will be described in more detail hereinafter.

The result of the storage process is stored or archived multimedia items, high points, trails and the index of associated information. The multimedia database can be structured so that the multimedia items are stored separately to the index data.

The retrieval process 9 allows the digital media items to be retrieved and displayed as will be described in more detailed hereinafter.

Figure 2:
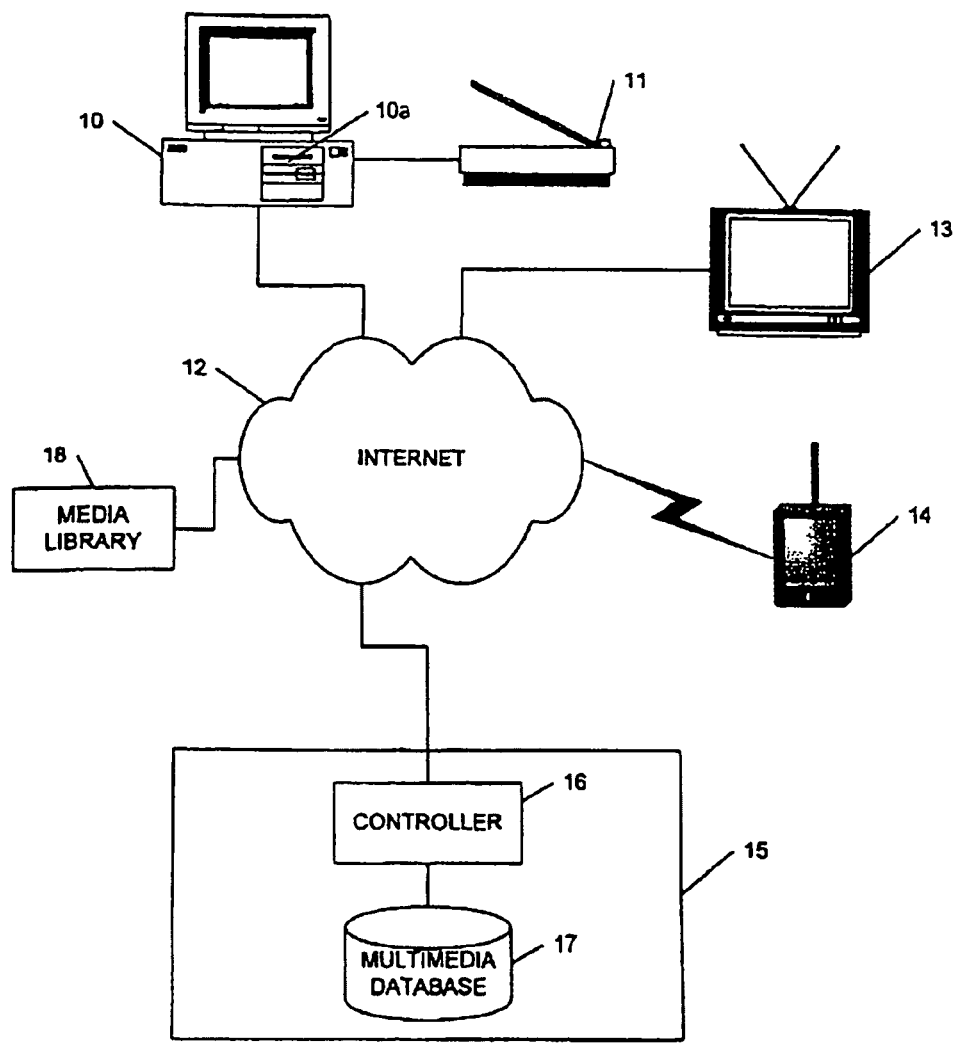
FIG. 2 is a schematic block diagram of a network arrangement of processing apparatuses implementing embodiments of the present invention.

FIG. 2 is a schematic diagram of a network demonstrating embodiments of the present invention. The embodiments of the present invention are implemented using the Internet 12 to communicate between the user device 10, 13 or 14 and the remote server 15. The user's devices 10, 13 and 14 are connected to the server 15 over the Internet 12. The user's device can comprise a general purpose computer 10 provided with a scanner 11 and a disk drive 10*a* (e.g. floppy, CD or DVD). This enables a user to input media items into the computer 10 either by scanning images or text or by inputting text, audio, image or video files on a disk using the disk drive 10*a*.

Alternatively, the user's device can comprise a web-TV 13 or a WAP enabled mobile device such as a mobile phone or personal digital assistant (PDA) 14.

The server 15 comprises a controller 16 and the multimedia database 17. The controller comprises a web server to provide the necessary web interface for the users, and a database interface for accessing the multimedia database 17.

Another source of media items for a user is a media library 18 such as a web site which is connected to the Internet 12. A user can thus access media items at the media library 18 over the Internet 12 and archive these in the multimedia database 17 at the server 15 for later retrieval.

The multimedia database 17 may archive single medium or multimedia media items. The content comes from the medium or media which surround the members of the group, e.g. films, music, mimicry and sayings (from actors, the group members etc.), TV adverts, TV programs, books, plays, books, photographs from personal events like dances, school trips, holiday and parties. The users may create some of the items themselves and obtain some items from on-line libraries such as the media library 18. Examples of library material are:

music samples advertising (not necessarily targeted at the users)

film and TV including clips from classic films, TV series and soap operas books such as text from drama, fiction and poetry mimicry, impersonations of any of the above.

As noted, the present invention is suited to groups of individuals with strong interpersonal bonds. It is envisaged that the service will be applicable to groups of teenage girls, women and families who will maintain and access the group archives over long periods of time. The service also will be applicable to young men, particularly those who engage in sports teams or other competitive endeavors. However, it is also applicable to individuals An individual or a small group with access to a single machine may use a local storage medium such as a hard disk drive.

The present invention finds application in business environments as well. In such applications, as media items are added to an archive reflecting important business milestones, the system can assist businesses to develop camaraderie among company employees. Employees can track company achievements and measure company growth over time, which can foster company loyalty among the employees.

Figure 3:
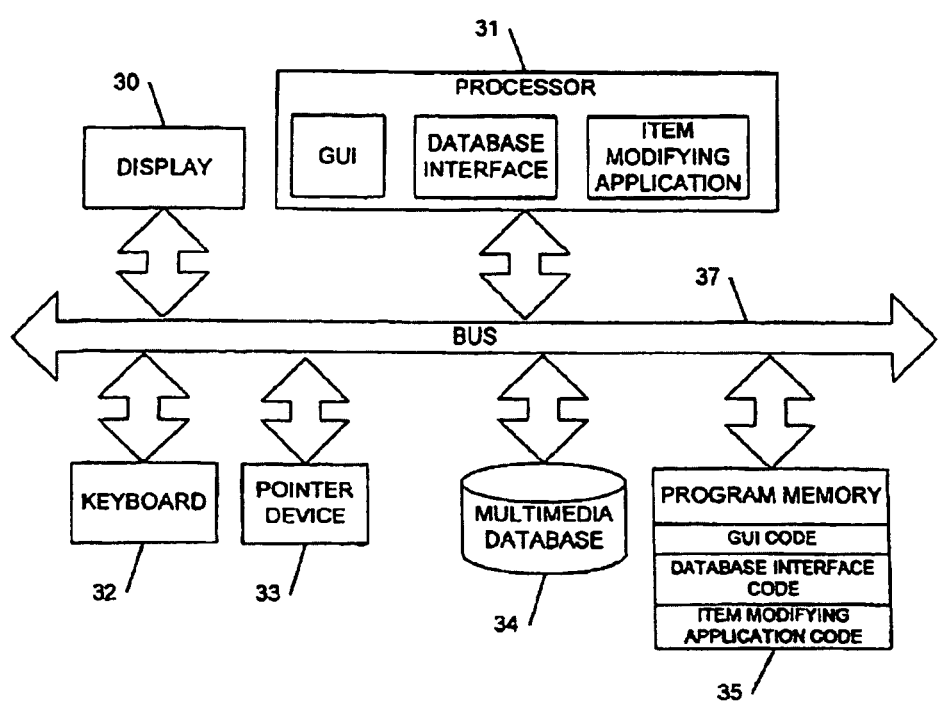
FIG. 3 is a schematic block diagram of a stand alone embodiment of the present invention.

FIG. 3 shows a schematic diagram providing local storage as mentioned hereinabove. The diagram illustrates schematically the architecture of a general purpose computer. The computer is provided with a display 30 for displaying options to a user and for displaying the media items. A keyboard 32 is provided for inputting text and a pointing device such as a mouse 33 is provided to allow user selections. A multimedia database. 34 is provided stored on a suitable storage medium such as a hard disk drive or CD ROM. Program memory 35 is provided storing computer code for implementation by a processor 31. The program memory 35 stores graphical user interface code for implementation by the processor 31 for providing a graphical user interface on the display 30. Database interface code is stored for providing a database interface to the multimedia database 34 for the retrieval and storage of media items. Also the program memory 35 stores media item modifying application code for implementing a media item modifying application to allow a user to modify media items for archiving all the components. All the components of the computer are interconnected by a control and data bus 37.

The present embodiment of the present invention is described with reference to groups of teenage girls. The present invention is also suitable for groups of women and families. Further, the invention is also expected to be useful for other types of private social groups such as work mates, sports teams or clubs and even individuals. Each type of group will have different sets of event types that are relevant to them. For example, for teenage girls the event types can comprise: party, holiday, dance, gig, show, school trip, date.

Figure 4:
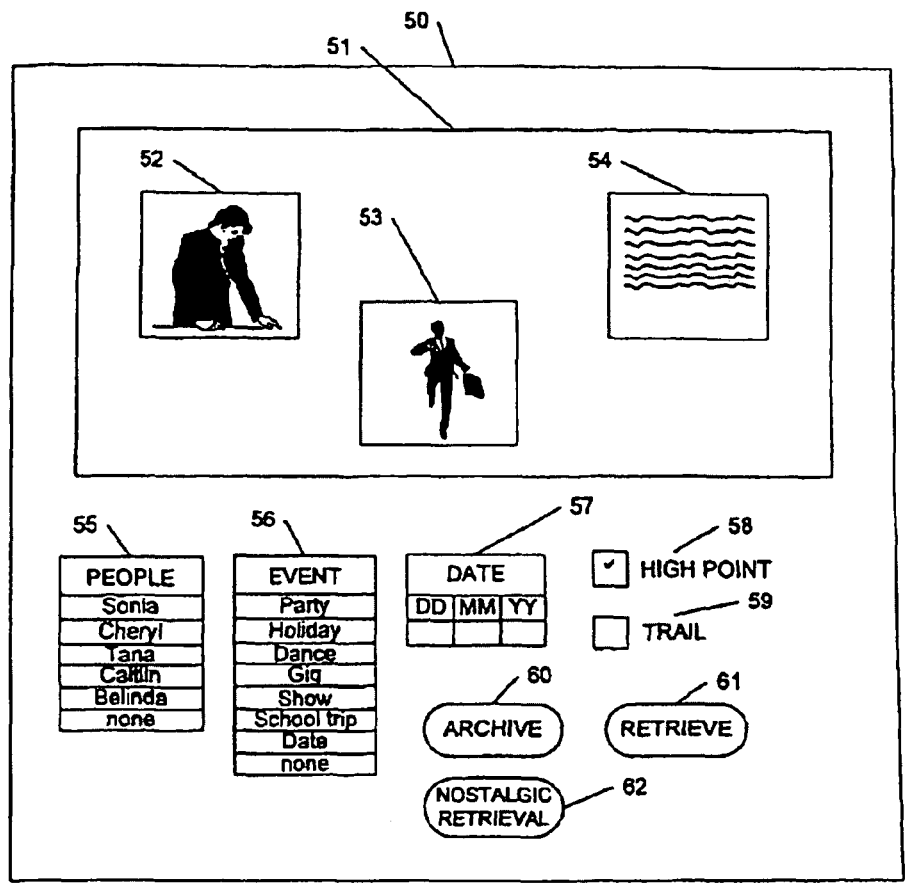
FIG. 4 is a diagram of the graphical interface in accordance with an embodiment of the present invention.

FIG. 4 is a diagram of a graphical user interface 50 which is displayed to the user in this embodiment. An area of the display is provided as a work space 51. In this work space media items such as images 52 and 53 and text item 54 can be placed using known computing techniques. Thus the media items represented in the work space 51 can be archived. The work space 51 can also be used for displaying retrieved media items. Beneath work space 51 are user controls for generating index information (called "tags" herein) for archiving or for generating a query when retrieving. A drop down box 55 is provided for selecting any of a number of people within the group. A drop down box 56 is provided for identifying one of a number of event types. A date entry 57 is provided to enable a user to enter a date. (A second date entry, not shown in FIG. 4, is also provided for retrieval of media items, to allow the entry of both the start and end dates of a time period.) If no date is entered, either today's date or a default "no date" is used for the query. Also the date entry field can be used incomplete. For example if no date is specified, month and year only will be used. Also if no date or month is specified then only the year will be used for the query. A check box 58 is also provided to enable selection of a high point and a similar check box 59 is provided to enable to designation of a trail. When the interface is used for archiving, any of the media items on the work space 51 can be selected e.g. by pointing and clicking, and if the high point check box 58 is checked and the archive button 60 is selected, the media item will be archived with the selected people, event Type and date selection and will be marked as a high point. Similarly the trail check box 59 is checked and a number of media items are selected in the work space 51, if the archive button 60 is selected, a user will be given an option to identify the sequence of media items in the trail and then the media items will be archived with indexes indicating the order in the tail.

A retrieve button 61 is also provided to enable retrieval of items in accordance with the criteria of people, event type, date, high point and trail. There is also provided a button for a nostalgic retrieval where retrieval takes place automatically to provide a serendipitous nostalgic experience for the user. The storage and retrieval processes will be described in more detail hereinafter.

The process of storage will now be described in more detail with reference to the flow diagram of FIG. 5 and the tables of FIGS. 6a, 6b, 6c, 6d and 6e.

Before the storage process begins, when the registration process (2 in FIG. 1) is carried out by a member or members of the groups, information is stored in a group table 6a. A group identifies a group and people in the group are identified. When a user wishes to use the system they will enter a user name and password thus identifying themselves as a member of a group.

Once the user has logged on and the user wishes to archive data, in step 71 media items 72 are imported onto the work space 51. At this point tag identifiers of the new items are generated and in step 73 the new items are stored. This causes the storage of the item identifier in the group table shown in FIG. 6b. The items stored are associated to the group to which the user belongs.

In step 74 the user will select whether or not the item comprises a high point. If the user selects the item as a high point representing a particularly memorable event, in step 75 the high point information is stored in the table illustrated in FIG. 6c. A high point flag is stored together with the item identifier. First the users have the opportunity to state whether the item, either on its own or with other items is a "high point". The user can thus decide whether the media item holds some special significance e.g. the last day of the group's last day in school, the first date of the quietest member of the group.

In step 76 the user can then decide whether media items displayed in the work space comprise a sequence of items that constitute a special trail that links them in some meaningful way. For instance:

1. An image depicts a still scene from a film,
2. A sound clip repeats a catch phrase from the film as spoken by one of the actors,
3. Another sound clip repeats the catch phrase in the voice of a school teacher,
4. An image depicts a caricature of the teacher.

If the user selects to store the media items as a trail, in step 77 the user selected sequence of items in the trail is stored in the trail table illustrated in FIG. 6d in the database. Each trail is given an individual identifier and each media item in the trail is identified by its item identifier in the sequence in the trail.

It can be seen from FIG. 5 and FIGS. 6c and 6d that the media item that is a high point can also comprise a media item in a trail.

In step 78 the users are given the opportunity to indicate which, if any, information is to be associated with each stored item. As illustrated in the graphical user interface of FIG. 4, the user can select:

which, if any the registered people are to be associated,
which, if any of the event types are to be associated,
which, if any, date is to be associated. If the user declines to suggest the date then the current date can automatically be associated or alternatively no date can be associated.

The database of groups of people 79 is thus used to provide the list of people. The table of event types 80 may be used to provide the event types available for each group. The calendar 81 may be used to provide relevant dates. When a user selects from among these people, event types and dates, the selected data are appended to the media items as tags.

The tag(s) are then stored in step 82 as index information as illustrated in FIG. 6e. Each item is identified by an item identifier, the medium type of each item is identified. This can either be automatically determined or a user can define the medium type. The people, time and event type tag(s) associated with each item are stored in the table linked to the item identifier.

The archiving process is then completed in step 83. Using this process the archive can gradually be built up over time with many media items, some of them grouped as high points, some of them forming pairs of trails and some of them indexed on associated information.

The retrieval process will now be described with reference to the flow diagram of FIG. 7. At some point in time following the storage, members will wish to delve into the contents of the group archive. They might want to do this to have fun, to settle arguments, to reminisce, to experience a stream of items as a changing backdrop to other activities, to tidy up or to add new items. The methods of retrieval in this embodiment are:

1. Experience items of the same medium type or types
2. Experience high points
3. Follow predefined trails 4. Experience items with certain focus
5. Engage in serendipitous nostalgia
6. Dip in at random.

The user can choose the particular method to be used at any time. It is assumed that there is always a focus in this embodiment determined either by the user or automatically. The focus can be based on tags; which involves a selection of one or more of: one or more people; date or time period; an event type.

The focus can be empty meaning that no person, time or event type has been specified. In this case all items in the database for a group are within focus.

Any combination of the retrieval methods can be used. The retrieval will depend upon the retrieval parameters selected by the user as illustrated in the graphical user interface of FIG. 4. The parameters can comprise the associations people, event type or date, high point, trail or a medium type. (The GUI of FIG. 4 does not show a means by which a user can select a medium type. Any suitable means can be used).

Figure 7:
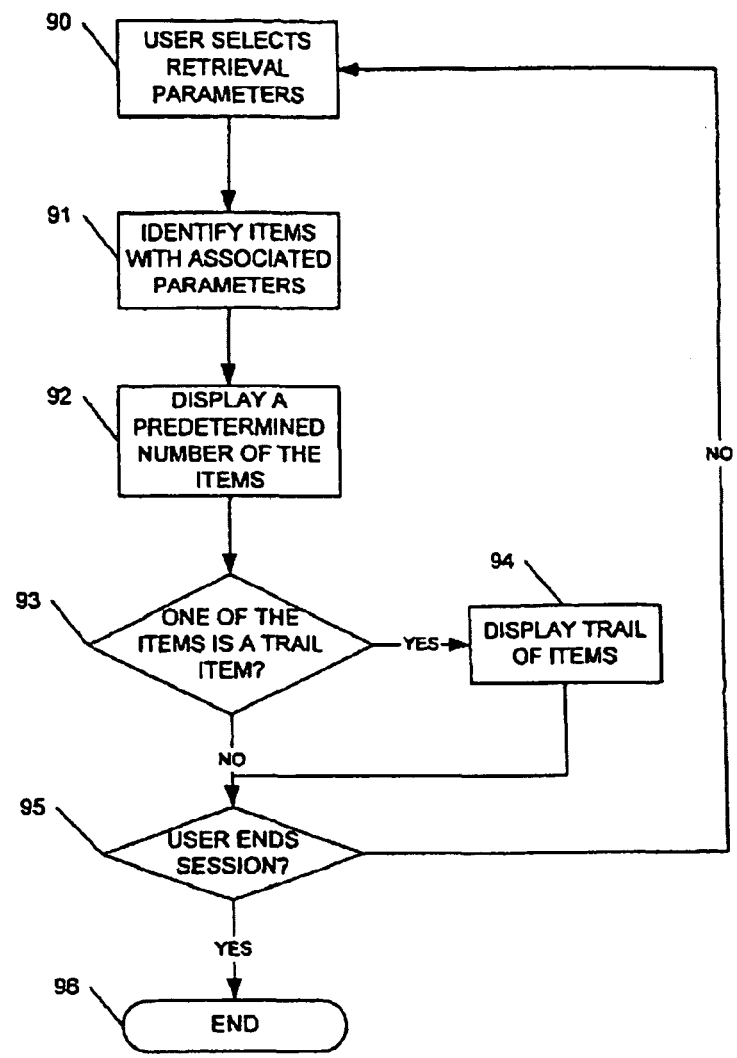
FIG. 7 is a flow diagram of the retrieval process in accordance with an embodiment of the present invention.

The flow diagram of FIG. 7 illustrates the retrieval process. In step 90 a user may select the retrieval parameters and in step 91 items are identified with the associated parameters. In step 92 a predetermined number of the items are displayed. If a large number of items are identified, in order to avoid clutter of the work space 51, the number of items displayed can be limited. An indication that there are more items can be displayed to allow the user to select the display of the further items. In step 93, it is determined whether one of the displayed items is a trail item. If so, in step 94 the items in the trail are displayed. This can either take place automatically or a user can be given a notification that then is a trail to follow from a specific displayed item to allow the user to select to fallow that trail and to display the items. In this way the user can undergo a nostalgic experience following the trail of media items.

In step 95 it is then determined whether the user has ended the session and if so the process is terminated in step 96. Otherwise the process returns to step 90. A selection of new retrieval parameters is made.

As illustrated in the graphical user interface in FIG. 4, a user may select to retrieve using nostalgic retrieval. This may result in a serendipitous nostalgia process resembling how one would browse through a box of old photographs or personal diaries: a start point may be chosen at random, or on the basis of a person, time (period) or event. Then, reviewing one or more items about that person, time or event may trigger linking one of the items to a different association and a new sequence of associated items is reviewed. For example, when looking at items relating to Summer of 1998, the picture of one of the group brings to mind an 18th birthday in which that person made a fool of himself/herself; or finding a diary in which a party is described moves the focus to a different event also described in the diary which took place around that time. So the nostalgic trip continues with random length sequences focusing on items that are associated in one way, followed by a shift in focus and a new sequence of items.

FIG. 8 shows an example of a serendipitous nostalgic journey. The first four columns show the items retrieved in sequence while the 5th to 7th columns show the current focus. Whenever the focus shifts, it is indicated in the 8th column. The arrow shows how the new focus is generated. The journey encounters both a high point and a trail, both of which are shown in the table.

Thus the serendipitous nostalgia retrieval process comprises identifying an initial focus comprising the parameters people, event type, and date. This can be randomly determined. An initial set of media items are retrieved using the initial focus. After that one or a number of the parameters are changed to change the focus and the new parameters are used for retrieving media items. There are many ways in which the focus can be automatically shifted. Table I below identifies some possible focus shifts in the serendipitous nostalgia retrieval process.

TABLE 1

Some possible focus shifts in serendipitous nostalgia

| CHANGE | EXAMPLE |
|---|---|
| narrow the focus by one level | if the old focus has no restriction on time period, then include a time period in the new focus |
| broaden the focus by one level | if the old focus specifies an event type, let the new focus have no restriction on event type |
| narrow the people focus | add more people |
| broaden the people focus | remove some of existing people |
| narrow the time focus | reduce the time period from a year to a season, from a season to a month, etc. |
| make a small focus shift | make people focus narrower or broader by just one person |
| make a large focus shift | select completely new people |
| make a larger focus shift | select completely new people and a different event type |
| make the largest focus shift | select new people, a different time period and a different event type |

There is also much scope for strategies for making successive focus shifts over time. Some possibilities are shown in Table 2 below.

TABLE 2

Some strategies for shifting focus
STRATEGY alternate broadening and narrowing the focus
broaden and narrow the focus at random
alternate small focus shifts and large focus shifts
small and large focus shifts at random
rotate focus shifts by people, time and event types,
choose randomly between changing people, time and event types
make shifts according to observed behavior of different kinds of groups The user may also wish to dip into the archive "at random". This may mean literally at random, i.e., each item is selected with no reference whatever to the previous one. This is easy for the retrieval process to handle.

It may alternatively mean that they want to see successive items that are as different as possible from each other. In this case the retrieval process can ensure the largest "distance" between two successive items, based on the associated information of the respective items. For instance items with non overlapping people are further away than those with overlapping people; items with different event types are further away than those with the same event types; the difference in times give a direct measure of item distance.

In an embodiment, if the nostalgic retrieval mode may entered while a media item is being presented by the system, subsequent retrieval operations may be made based on tags associated with the currently-presented media item. In this embodiment, the system may determine if the tags include identifiers of people associated with the group and, if so, the system may search for other media items having tags that identify common people. Hypothetically, if a currently-presented media item has three people assigned to it by way of tags, the system may run searches for those same three people and present media items for which matches are detected. The system may present the matching media items by focusing on each of the three people serially or, alternatively, may randomly present media items for which any of the three people are identified. If the nostalgic retrieval mode is entered while a media item is being presented and the media item has no people assigned via tags, the system may determine whether the media item has tags identifying event types or dates. The system may retrieve other media items having the same event type or date tags associated with them and present those media items in the nostalgic retrieval mode.

In another embodiment of operation, shown in FIG. 9, the system may provide a plurality of temporary work spaces 910.1-910.$n$ for management of media items. In this embodiment, the system may provide both a temporary workspace 910.1 and archive storage 920.1 for each group. The temporary workspace 910.1 may store media items that are uploaded to the system by group members. The archive 920.1 may store media items that have been assigned tags according to the identifiers associated with the group—tagged with people, event type and/or time identifiers. Untagged media items may be stored in the temporary workspace 910.1 for a predetermined time, say one month, but may be deleted from the system after the predetermined time elapses if they have not been assigned tags by group members.

The temporary workspace 910.1 provides a convenient mechanism through which group members may review new media items uploaded by other group members and to select media items for archiving. Consider an example where, following a group event (say, a wedding or corporate retreat) a group member uploads digital images to the system representative of the event. The digital images may be uploaded to the system on a particular date (say, 1 Nov. 2008) without tags. During the next month, other group members may review the media items from the temporary workspace and may decide that certain images should be archived. At such times, the other group members may assign tags to the images. When such tags are assigned, the system may include the selected image(s) in the group archive 920.1, whereupon they are protected against deletion by the system. Any media items that remain untagged after the predetermined period elapses may be deleted from the system.

Of course, uploading users may assign tags to media items as the items are uploaded to the system. For example, a user may upload a set of 10 pictures to the system, tagging each one of them with a selected event type (say, wedding). In such a case, the media items would be added to the group's archive 920.1 regardless of any interaction by other group members.

In another embodiment, the system may permit copying of media items between group archives and/or group workspaces. As commonly occurs in social interaction, users may belong to multiple groups. Media items may apply to multiple groups. For example, someone who marries a second time may import media items of children from one group (prior to the marriage) to a second group (the new family). In such cases, the system may provide features to permit a user to copy media items between groups to which he/she belongs. In an embodiment, as a security provision, the system may restrict the user from copying of media items uploaded by other group members unless consent of the uploading group member is given. In such cases, the user will be permitted to copy media items between groups only if that particular user imported the media item to the system initially.

FIG. 9 illustrates use of the present invention in a network environment where the archives 920.1-920.$n$ and temporary workspaces 910.1-910.$n$ are maintained by server. In such an environment, individual users may access the server from terminals provided in communication with the server via a network such as the Internet.

Figure 10:
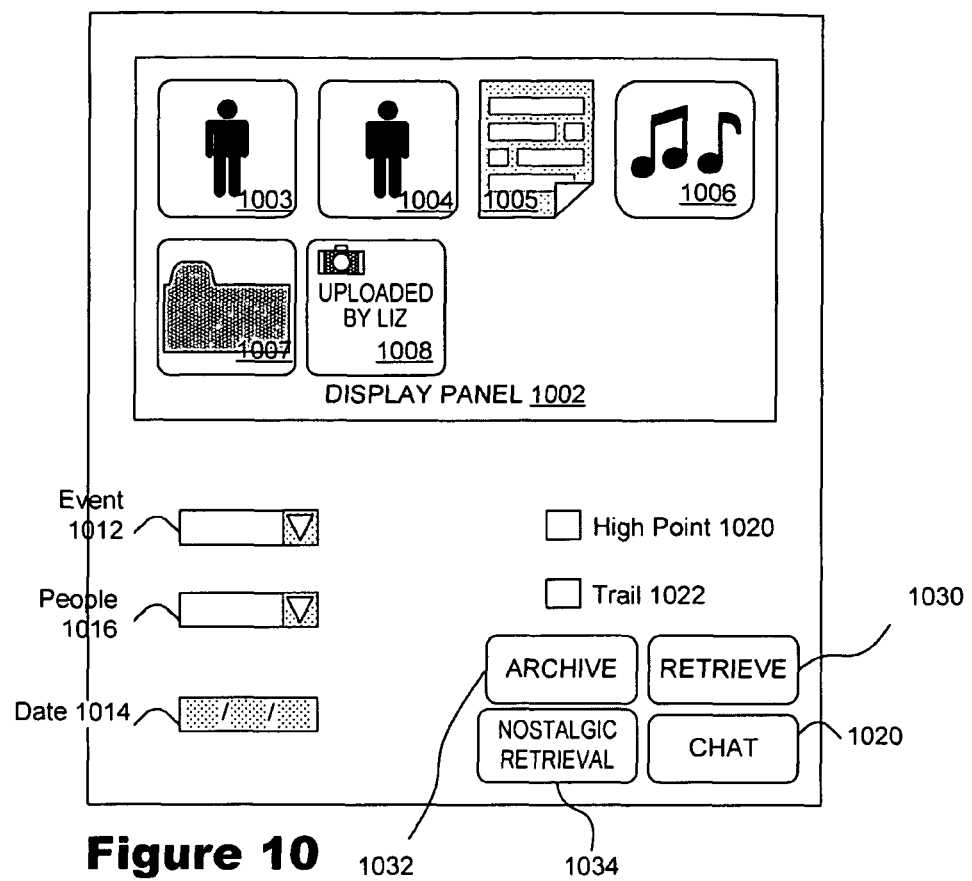
FIG. 10 illustrates a diagram of the graphical interface in accordance with an embodiment of the present invention.

FIG. 10 illustrates a user interface 1000 according to another embodiment of the present invention. An area of the display may be provided as a display panel 1002. The display panel 1002 may display media items 1003-1007, which as noted may include images 1003-1004, text item 1005 and audio files 1006. The user interface also may display icons 1007-1008 for navigation purposes as discussed herein. The user interface 1000 also may include various tools through which a user may assign tags to media items for archival. These tools may include, for example, pull down menus 1012-1016 to assign tags to media items and high point and trail identifiers 1020, 1022. An archive button 1032 will cause the system to save tags to media items, which will cause the system to transfer a previously untagged media item from a temporary work space to the archive.

In one embodiment, when a user opens a new session with the system, the system may present newly added items in the first instance of the user interface 1000. Thus, the newest items may be presented in a "home page" for the group, which can be browsed by the user to identify new media items that have been added to the group most recently. These new media items may include untagged media items that reside in the temporary workspace 910.1 (FIG. 9) or tagged media items that are stored in the group's archive 920.1. To select media items for the initial display, the system may search the group storage spaces, both the temporary workspace 910.1 and the archive 920.1, identify media items that have an upload date within a certain period of time (say, the past 30 days), retrieve and display them. Thereafter, the user may use the system's tools at his discretion.

In an embodiment, new media items that have been tagged with a common event type may be displayed as an "album" 1007, an icon that represents a navigation pathway to a plurality of media items tagged with the event type. In this embodiment, when a user begins a new session with the system and the system searches for media items with a recent upload date, the system may group tagged media items by event type and present an album icon representing the event type. If a user interacts with the album icon 1007 (for example, by clicking or double-clicking on it), the system may present the media items of the album in a new display screen (not shown).

Additionally, the system also may store metadata associated with each media item to identify the group member that uploaded the respective media item to the system (stored in a "recorded by" field). When a user opens a new session with the system, the system may display other icons 1008 identifying media items that were uploaded by other group members. User interaction with such an icon (for example, by clicking or double-clicking on it) may cause the system to present the media items uploaded by a common group member in a new display screen (not shown). Thereafter, the user may interact with the media items associated with the icon, for example, by reviewing the media items and possibly adding tags to them.

In this regard, it should be appreciated that the "recorded by" field stored for a particular media item is distinct from a people "tag" applied to the media item for indexing. The recorded by field merely identifies a group member who uploads a media item to the system. Media items may be uploaded to the system as either tagged or untagged media items. When a tag is added to a media item identifying a person, the tag indicates that the media item is relevant a particular group member. In many common instances, a media item will be uploaded by a first group member but be assigned a tag that identifies some other group member. The uploaded by icon 1008 merely provides a convenient technique for group members to navigate among newly added media items for review.

The system also may include a chat feature, which can be accessed via a button 1020 of the user interface. When engaged, the system may display a record of messages posted by group members to other members of the group. The chat feature may provide a convenient mechanism for group members to post temporary messages within the group, particularly when adding new media items to the system calling attention to particular items. The system 1000 may maintain messages for a predetermined period of time (say, 30 days) after which, they are deleted.

Figure 11:
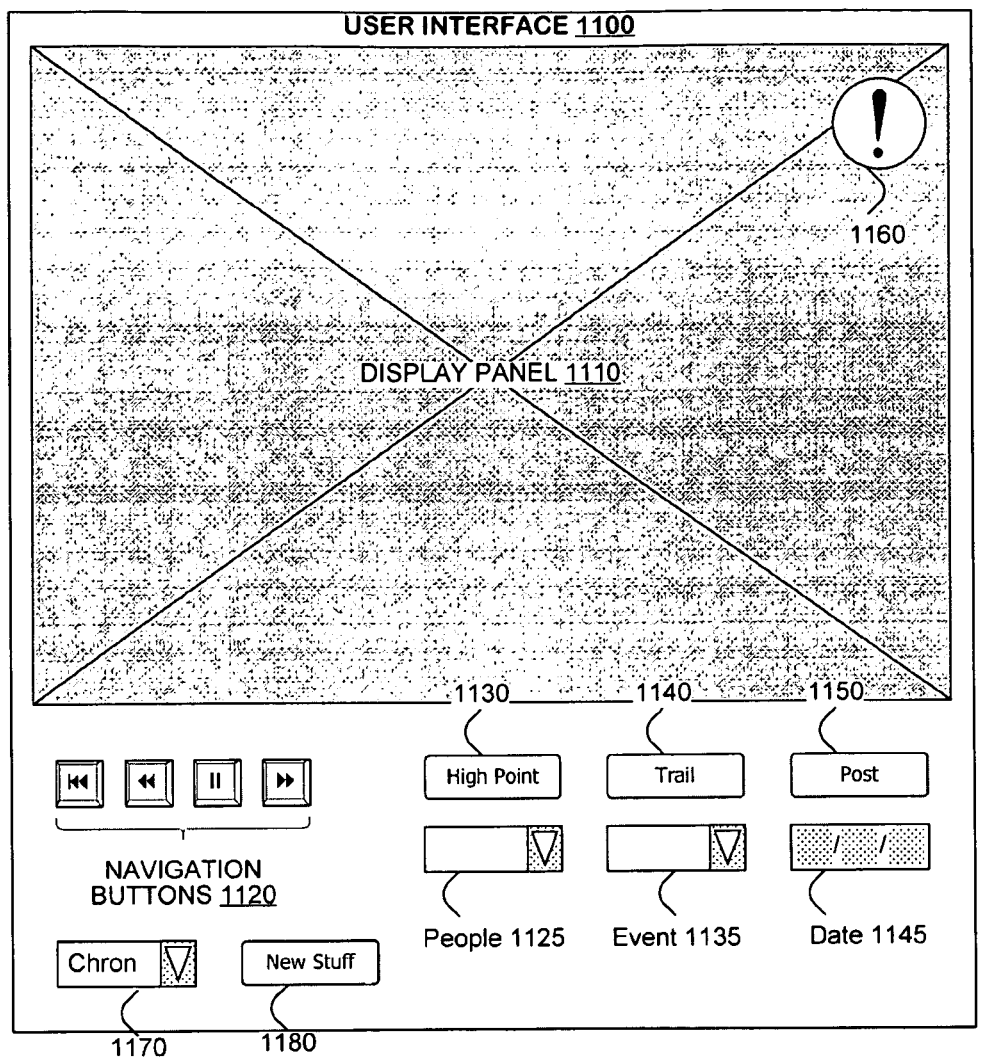
FIG. 11 illustrates another user interface according to an embodiment of the present invention.

FIG. 11 illustrates a user interface 1100 according to another embodiment of the present invention. This embodiment illustrates a user interface 1100 that may be used during item browsing. The user interface may include a display panel 1110 for display of a currently viewed media item and navigation controls 1120-1145 to control presentation of media items. Directional controls 1120 may permit users to pause a presented media item or to scroll forward or backward as desired. Other controls 1130-1145 may engage or disengage different modes of presentation, for example, the presentation of high points or trails or to select tags (people, events, dates) on which to focus presentation.

The user interface 1100 also may present a control 1150 to permit an operator to supplement media items with posts. Herein, a "post" is an auxiliary media item that may be stored in association with a primary media item that may include recorded notes of group members. For example, a photo may have a text note stored with it as a post. The text note may include member descriptions of events associated with the photo. A post may take any form and may include, text files, audio files and digital images. In one embodiment, a text pad may be provided when a user clicks on the post button 1150. In another embodiment, a voice recording menu may be provided when a user clicks on the post button 1150. Further, the system may permit group members to import posts from media items created external to the system and store them as linked to primary media items.

During retrieval operations, when the system presents a media item that has a post associated with it, the system may display an icon 1160 indicating the presence of a post. User interaction with the system may cause the post to be presented as well. For example, a user may click on the icon 1160 to cause the system to present the post. Alternatively, if an operator pauses playback on a media item for which a post exists, the system may present the post automatically after a predetermined period of time (say, 30 seconds).

As noted, retrieval may be based on a specific person or a group. The user interface may include user interface elements 1125 to permit a user to specify a person on which the search operations are to focus. In an embodiment, the user interface also may include a user interface element 1170 through which a user may specify an order for presentation of media items, for example, chronological order or reverse chronological order. In a further embodiment, a user may command the system to search for media items tagged as associated with a specified person regardless of the group. In this manner, a chronological presentation may display media items along the identified person's lifetime.

Additionally, the user interface may include a button 1180 through which a user may decide to review material not yet seen. In this embodiment, the system may store a user history, which records media items that the user has seen in previous sessions. During playback, the system may compare stored media items against the user history to ensure that media items being presented have never been presented to the user before or, alternatively, have not been presented to the user within a predetermined amount of time or number of user sessions.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of managing media items in a media retrieval system based on episodic memory of a social group, comprising:
    when a user opens a new session with the retrieval system, authenticating the user as a member of a pre-registered social group,
    importing media items from the user,
    storing the media items in storage for subsequent viewing, tagging retrieval by members of the social group,
    determining whether the media items have been tagged with index information, the index information representing episodic memory triggers of the social group and including at least one valid selection taken from the group triggers of: persons associated with the social group, event types associated with the social group and time associated with the social group, and
    purging select media items from storage that remain untagged a predetermined amount of time after having been imported to the media retrieval system, wherein media items that are tagged within the predetermined amount of time are protected against the purging.

2. The method of claim 1, further comprising if, before the predetermined amount of time elapses, a group member tags a media item in a current workspace with a valid selection of at least one of: persons associated with the social group, event types associated with the social group or a time associated with the social group, archiving the respective media item to protect against subsequent deletion.

3. The method of claim 1, further comprising, upon request of a user to copy a media item that is tagged with episodic memory triggers associated with a first group to a second group:
    identifying a group member that uploaded the respective media item to the system,
    if the user is the group member, copying the media item with the second group, and
    if the user was not the uploading group member, rejecting the request.

4. A method of managing media items in a media retrieval system, comprising:
    when a first user opens a new session with the retrieval system, authenticating the user as a member of a pre-registered social group,
    searching a media storage associated with the pre-registered social group in the media retrieval system,
    presenting all media items uploaded to the system by all users of the pre-registered social group,
    presenting the identified media items to the first user in a first display interface, and
    responsive to user command, tagging any of the identified media items with index information representing episodic memory associated with the pre-registered social group, the index information including a valid user selection taken from the group of: persons associated with the group, event types associated with the group, and time;

wherein, following the tagging by the first user, the other user's tagged media item is thereafter protected against deletion by a purging operation of the retrieval system.

5. The method of claim 4, further comprising, if multiple identified media items are stored with tags identifying a common event type and a common time associated with the pre-registered social group, the first display interface includes an album icon representing the event type.

6. The method of claim 4, further comprising, if multiple identified media items are identifying as being uploaded by a common group member, the first display interface includes an icon representing the multiple media items as an album.

7. The method of claim 4, further comprising presenting other media items that match a user selection in a playback mode presented via a second display interface, wherein the second display interface presents multiple media items in sequence and includes a command interface through which a user can add a post, an auxiliary media item to a currently-presented media item.

8. The method of claim 7, further comprising storing a text item as the auxiliary media item in association with the currently-presented media item.

9. The method of claim 7, further comprising storing an audio file as the auxiliary media item in association with the currently-presented media item.

10. The method of claim 7, further comprising storing an image file as the auxiliary media item in association with the currently-presented media item.

11. The method of claim 4, further comprising presenting other media items that match a user selection in a playback mode presented via a second display interface, wherein the second display interface presents multiple media items in sequence and includes a command interface through which a user can cause display of previous posts, auxiliary media items associated with a currently-presented media item.

12. The method of claim 4, further comprising presenting other media items that match the user selection in a playback mode presented via a second display interface, wherein the second display interface includes a command interface through which a user can command the system to present media items in order by a date tag.

13. The method of claim 4, further comprising presenting other media items that match the user selection in a playback mode presented via a second display interface, wherein the second display interface includes a command interface through which a user can command the system to present media items that have not been presented to the user previously.

14. A method of managing media items in a media retrieval system, comprising:
    when a first user opens a new session with the retrieval system, authenticating the first user as a member of a pre-registered social group,
    presenting to the first user digital media items stored in a current workspace associated with the pre-registered social group,
    responsive to a first user's import command, importing a new digital media item to the current workspace of the pre-registered social group, the newly imported digital item being scheduled for deletion from the retrieval system after a predetermined amount of time elapses;
    authenticating a second user as a member of the pre-registered social group;
    responsive to a second user's assignment of a tag to a select digital media item imported by the first user, archiving the select media item to protect the tagged digital media item against deletion from the retrieval system; and
    deleting, from the retrieval system, untagged media items according to their respective schedules for deletion;
    wherein tags assigned to media items represent episodic memory triggers associated with the pre-registered group and including include at least one of: persons associated with the group, event types associated with the group and/or a time associated with the group.

15. The method of claim 14, wherein the presenting to the first user comprises presenting to the first user identifiers of any digital media items imported to the system by the first user and identifiers of any digital media items imported to the system by other members of the group.

16. The method of claim 14, wherein the system prevents access to the group's current workspace to any non-member of the group.

17. A method of managing media items in a media retrieval system based on episodic memory of a social group, comprising:
    authenticating a user as a member of at least two social groups defined within the media retrieval system,
    storing media items associated with a first social group to which the user is a member, the media items having index information associated therewith, the index information representing episodic memory triggers of the first social group and including valid selections taken from the group of: persons associated with the first social group, event types associated with the first social group and a time associated with the first social group,
    responsive to a request from the user to copy a selected media item from the first social group to a second social group to which the user is a member, determining whether the user has permission to copy the select media item between social groups in the media retrieval system; and
    when the user has such permission, associating the select media item with the second social group.

18. The method of claim 17, further including:
    displaying a query that identifies episodic memory identifiers of the second social group and including valid selections taken from the group of: persons in the second social group, event types associated with the second social group; and
    searching a media storage for the digital media items that satisfy the selection criteria and retrieving.

19. The method of claim 18, wherein the episodic memory identifiers for persons include names of group members.

20. The method of claim 17, wherein the index information includes a flag that distinguishes high point items from other items, and the method further comprises setting the flag if the archiving input data includes an indication that a selected digital media item is a high point.

* * * * *